A. Bartholf.
Imp<sup>d</sup> Saw-Gumming or Toothing Machine.
N° 76147.  Patented Mar. 31, 1868.
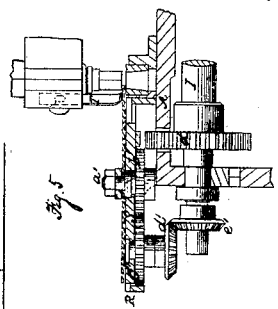
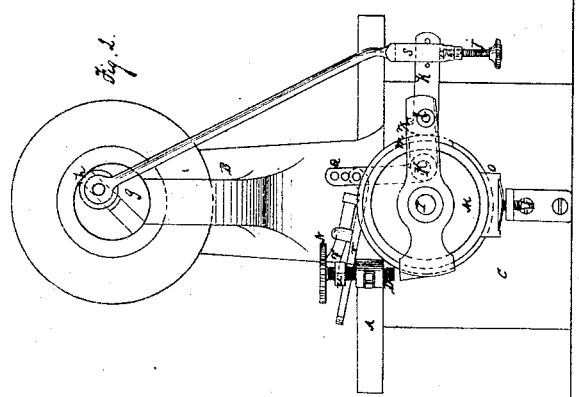
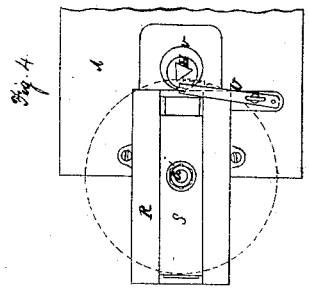
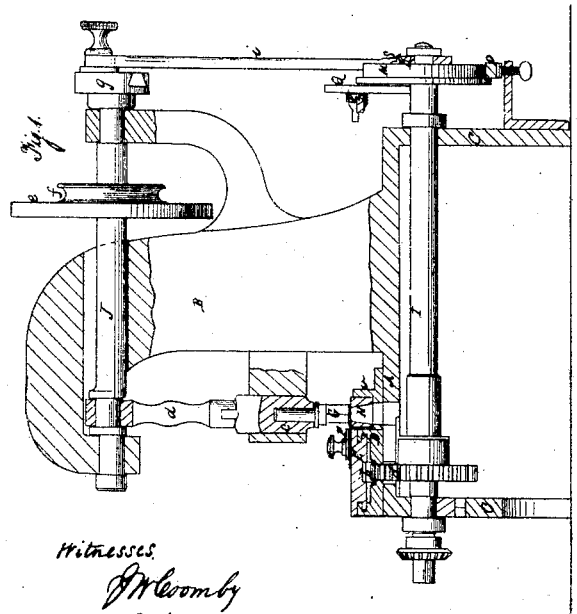
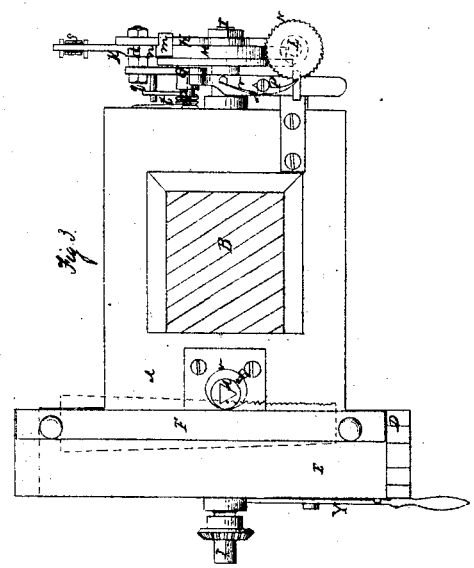
Witnesses
J. W. Coomby
A. Deller.
Abm. Bartholf

United States Patent Office.

ABRAHAM BARTHOLF, OF NEW YORK, N. Y.

*Letters Patent No. 76,147, dated March 31, 1868; antedated October 1, 1867.*

---

IMPROVED SAW-GUMMING OR TOOTHING MACHINE.

---

The Schedule referred to in these Letters Patent and making part of the same.

---

TO ALL WHOM IT MAY CONCERN:

Be it known that I, ABRAHAM BARTHOLF, of the city, county, and State of New York, have invented a new and useful Improvement in Saw-Gumming or Toothing Machines, of which the following is a full, clear, and exact description, reference being had to the accompanying drawing, forming part of this specification, and in which—

Figure 1 represents a longitudinal vertical section of a machine constructed according to my improvement.

Figure 2, a rear elevation of the same.

Figure 3, a horizontal section thereof, taken immediately above the table.

Figure 4, a plan of devices adapting the machine to cut circular saws; and

Figure 5, a vertical section of the same.

Similar letters of reference indicating corresponding parts.

This improvement, which is applicable to cutting the teeth either in straight, curved, taper, or circular saws, consists, firstly, in combination with a punch and die, or other suitable or equivalent devices for cutting the teeth in a straight, curved, or taper saw, of an automatic graduating feed to the saw, for the purpose of giving an irregular and graduated size or character to the teeth of the saw throughout its length or portion thereof; also, in a combination of devices for facilitating, without arresting, the general motion of the machine, changing the cutting of the teeth in the saw from a regular to a graduating size or character, or *vice versa*. Furthermore, said invention consists in a combination of an automatic feed to circular plates, and stripper, for cutting the teeth in circular saws, and clearing them of the cut particles; also, in such connection, or for cutting teeth in circular saws, of a yielding presser to the saw-plate to prevent backlash in cutting, without restricting the feed of the plate.

Referring to the accompanying drawing, A represents the bed or table of the machine, B an upper standard cast to or erected thereon, and C the legs or under portion of the framing. On the bed or table A, in front, where the machine is designed to cut rip or other saws having more or less a straight character, though they may be more or less curved, tapered, or bellied on their cutting edges, is arranged a cross-bed, D, that has seated upon, for traverse along it, a sliding table, E, on which is secured, say, by a clamping-bar, F, the saw-plate represented by red lines in figs. 1 and 3. This saw-plate has the teeth cut in it by the joint action of an intermittent cross-feed, giving the sliding table E, with the saw-plate on it, a movement equal to the length of a tooth at a time, and vertical reciprocating punch or cutter, G, operating in connection with a die, H, the feed of the sliding table E being effected at intervals, say, by a shaft, I, carrying a pinion, $a$, gearing into a rack, $b$, on the bottom of the sliding table E, and the punch G being reciprocated up and down by its attachment to a plunger, $c$, driven by a rod, $d$, from or by an eccentric on a shaft, J, which may be the driving-shaft of the machine, and be operated, by belt or band, through pulleys $e$ or $f$. To produce an automatic feed of the sliding table E, from the shaft J, there is hung, on the back end of the latter, a slotted disk, $g$, carrying a slide, $h$, adjustable in or out from the centre of the disk, to give a fixed primary variation to the throw or feed through a rod, $i$, pivoted to the slide $h$, and connected by a strap or slotted formation, $s$, of it at its lower end, where may be provided an adjusting-screw, $j$, to an arm, $k$, pivoted, as at $l$, to a lever, K, of a friction-clutch or driving-device, similar, it may be, to that used in other feeding-arrangements, and as applied to sewing-machines, the lever K being loosely hung on the shaft I, and striking at its back end, in its one stroke, a stop, L, and carrying at or near its other end a movable shoe, $m$, made to fit over or lap against a wheel, M, fast to the shaft I, which shoe is, in the up stroke of the arm $k$, caused, by a cam, $n$, on the end of the latter, to bear against the wheel M so as to feed or partially turn said wheel, the shoe $m$ being relieved from bite in the down stroke of the arm $k$, and the wheel M restrained from turning back by a stationary shoe, $o$, while the stop L, accordingly as, in point of time or distance travelled, the back end of the lever K strikes it, determines the extent of feed to the wheel M, by causing the strap $s$, of the rod $i$, to give more or less lifting action on the arm $k$, and consequently more or less motion to the shoe $m$. In this way it will be perceived that an automatic feed is given to the table E, and saw-plate thereon, equal to the length of a tooth, in each reciprocating action of the punch G. But, as in the case of rip-saws for instance, it is frequently necessary or advisable to vary, in a regular or irregular manner, the size or pitch of the teeth throughout the length of the saw, I not only make the stop L adjustable by, say, giving it a screw formation, which, accordingly as it is raised or lowered, controls, as described, the feed, to give a coarser or finer pitch to the saw-teeth, but also communicate at pleasure a positive motion to said stop L, by, it may be, a ratchet-wheel, N, on the head of it, operated by a spring-borne pawl, P, pivoted to a slide, r, which is connected, in an adjustable manner, to vary its throw, to a bell-cranked lever, Q, working on a fulcrum, as at p, and driven to actuate the ratchet-wheel N and screw-stop L by connection, as at q, with the vibrating-lever K, while a spring, t, serves to throw back the slide r and pawl P. Thus, supposing the screw-stop L to be adjusted in the first instance so as to control the lever K, to give a small amount of feed to the saw-plate, and the pawl P to be in gear with the ratchet-wheel N, then, as each successive driving-stroke of the pawl unscrews or raises the stop L, so will each successive feeding-stroke of the wheel M and feeding-movement of the saw-plate be proportionately increased, thus giving a gradually coarser pitch each successive tooth cut, the advantage of which in rip-saws will be readily understood.

The pawl P, however, is so constructed and controlled by its spring, as seen in fig. 3, as that it may at any moment, without stopping the machine, be thrown and held by its spring out of gear with the wheel N, when, till again thrown in gear, the stop L having a stationary character, the machine will cut teeth of a regular size or pitch, whereby the graduating character given to the saw-teeth may either be regular and successive, tooth by tooth, or in series of several teeth for a given distance, and then of an altered pitch for the next series, and so on, the teeth in each series being progressively coarser, or regular and uniform, accordingly as the stop L is driven automatically, as described, or set at intervals by hand, to vary the feed. The screw-stop L also may be so set as that at a certain point or distance in the graduating feed established by its rotation, the pawl P will slip or fly under the wheel N, and thus an automatic stop be given to the graduating feed for the remainder of the saw. Also, said stop L may be provided with an adjustable nut, u, for, as in the case of a series of saws to be made of similar character and pitch of teeth, determining in an automatic manner the pitch at starting by screwing down the stop L till the nut u strikes the box through which the stop L works. Furthermore, it is advisable, in order, without stopping the machine, to arrest the feed, as circumstances may require, to so suspend the shaft I as that it may be dropped at its forward end through a hand-lever, Y, to throw said shaft or its feed-operating wheel out of gear with the table carrying the saw-plate.

A machine thus constructed, it will be seen, is not only capable of being instantly changed to cut any number of teeth to the inch, either of regular or graduating size, and, while applicable to cutting various kinds of saws, is prominently advantageous in manufacturing rip-saws by reason of its graduating facilities, and web-saws, as the machine can be set to stop automatically at any given point required. Also, by an arrangement of means, hereinafter described, circular saws.

To vary the angle of the tooth cut, or to give it more or less hook, as it were, the punch G, which is of angular form in its cross-section, is set so that it may be turned in its bolster, c, to give more or less obliquity in its cut relatively to the toothed edge of the saw-plate; and, in connection with such provision, the die H, the aperture in which corresponds to the shape of the punch, is also made capable of being similarly turned and set in its holder, v, said punch and die occupying concentric positions relatively to each other in such adjustment, and, when adjusted—the die being turned by the punch in it, or latter by the former—both die and punch may be secured by set-screws passing through the punch-holder and die-bolster.

To adapt the machine to cutting circular saws, the cross-bed D and sliding table E are removed, and in place thereof a bed, R, carrying a slide, S, is fitted on the main bed or table A, said slide having a vertical shaft, a', on or over which is slipped and to which is secured the circular-saw plate, the relation of which (shown in red lines) to the punch and its die is represented in fig. 4. This shaft a' carries a toothed wheel, b', which gears into a wheel, c', that has hung on its shaft a bevel-wheel or pinion, d', made to gear with a bevel-pinion, e', on the shaft I, and by which, through the feeding-devices, as hereinbefore described, omitting the successive graduation of the feed each tooth cut, the saw-plate is rotated or turned the distance of a tooth at a time, the pitch being regulated by the adjustable stop L to the feed, for action on the plate of the punch G, operating in connection with its die, till the whole circumference of the saw-plate is cut, which plate may be adjusted to or from the punch, and its driving-gear brought in or out of working connection by suitably adjusting the slide S.

Attached to the box of the bolster c, or other suitable part, is an adjustable stripper, T, which, resting over the periphery of the saw-plate in the vicinity of the punch, serves, in the up stroke of the latter, to arrest, lift, and vibrate the plate, and to detach any adhering blanks cut out of the plate in the formation of the teeth. To prevent backlash, or action of the saw-plate and its operating-gear after each successive cut, which is so essential to regularity in forming the teeth, and to give increased steadiness to the saw-plate, the bed R has connected with it an adjustable spring-presser, U, preferably carrying a roller at its outer end, which is arranged to bear upon the saw-plate over or in close proximity to the die H. In this way the machine is made to cut the teeth in a circular-saw plate in a regular manner by an automatic feed of the plate.

What is here claimed, and desired to be secured by Letters Patent, is—

1. The combination, with a reciprocating punch and suitable die, of an automatic graduating feed to the saw-plate, substantially as specified.

2. In combination with the lever K of a friction-feed or driving-device to the saw-plate, the adjustable stop L, with its ratchet-wheel N and pawl P, or the equivalents of these devices, for giving at pleasure a graduating or uniform feed to the plate, essentially as herein set forth.

3. The adjustable automatic feed, constructed and operating substantially as shown and described, in combination with a circular-saw plate-holder and driving-mechanism, as set forth.

4. The adjustable spring-presser U, in combination with a revolving plate-holder and its driving-mechanism, for operation in connection with a reciprocating punch, and relatively to the die thereof, essentially as shown and described, for the purpose or purposes specified.

ABM. BARTHOLF.

Witnesses:
J. W. COOMBS,
A. LE CLERC.